United States Patent [19]

Diepeveen

[11] 3,809,860

[45] May 7, 1974

[54] DIE FRAME SUPPORT WITH HEATER ELEMENT

[76] Inventor: John C. Diepeveen, 1737 Kimberly Dr., Sunnyvale, Calif. 94087

[22] Filed: Mar. 16, 1973

[21] Appl. No.: 342,012

[52] U.S. Cl. ............... 219/385, 29/203 P, 219/388, 219/521, 228/6, 269/55, 269/321 WE

[51] Int. Cl. ....................... F27d 11/02, H01t 43/00

[58] Field of Search .......... 219/246, 259, 385, 388, 219/521, 530, 536, 537, 158, 79, 80; 269/55, 74, 79, 82, 311 WE; 29/203 P, 203 J; 228/3, 4, 6

[56] References Cited

UNITED STATES PATENTS

| | | | |
|---|---|---|---|
| 3,609,295 | 9/1971 | Bielefeldt | 219/388 |
| 3,114,199 | 12/1963 | Flodberg | 29/209 J |
| 3,377,711 | 4/1967 | Wempe | 269/55 X |
| 3,641,648 | 2/1972 | Kalberman | 29/209 B |
| 3,695,501 | 10/1972 | Radobenko | 228/3 |
| 3,738,560 | 6/1973 | Kuliche et al. | 29/203 P X |

*Primary Examiner*—Volodymyr Y. Mayewsky
*Attorney, Agent, or Firm*—Townsend and Townsend

[57] ABSTRACT

A support for positioning a die support frame for movement in a generally vertical plane past a heater element carried by the support. A generally horizontal rail is adjustably mounted on the support below the path of travel of the frame so that the support is suitable for use with frames of different heights. The support has a clamping finger shiftably mounted thereon and biased toward the heater element for clamping a portion of a die frame against the heater element to thereby heat the frame portion so as to allow a semiconductor chip to be bonded thereto.

12 Claims, 5 Drawing Figures

PATENTED MAY 7 1974 3,809,860

DIE FRAME SUPPORT WITH HEATER ELEMENT

This invention relates to improvements in the handling of die support frames during the attachment of semiconductor chips thereto and, more particularly, to an improved support for such a frame disposed in a generally vertical plane.

BACKGROUND OF THE INVENTION

In the manufacture of semiconductor components, such as transistors, integrated circuits and the like, semiconductor chips are bonded to pads on a generally planar frame movable past a heater element which applies heat energy thereto to heat the pads. An operator places a chip on each pad and the heat of the pad effects a bond between the chip and the corresponding pad.

For certain types of semiconductor chips, it is necessary to bond the same to terminals at one side margin of a die frame. For example, a light-emitting diode having two terminals is bonded to the ends of two leads which are one of a number of pairs of leads comprising a planar frame. The operator must place the chip on the ends of the two leads as the same are heated. This is best done by positioning the frame in a vertical plane and then applying heat to the leads. A need, therefore, has arisen for a support for maintaining the frame in a vertical position, and to permit the support to be used with frames of different sizes.

SUMMARY OF THE INVENTION

The present invention is directed to an improved die frame support for positioning a planar die support frame in a vertical plane so that the upper margin of the frame, defining the ends of vertical leads, will be oriented properly to permit semiconductor chips to be bonded thereto. The support has a frame support rail permitting a frame supported thereby to be manually moved in the vertical plane. Thus, successive portions of the frame can be provided with semiconductor chips thereon, such as when such portions are moved successively into heat transfer relationship to said heater elements.

The frame support rail is adjustably mounted on the support body for vertical movement relative to the heater; thus, frames of different sizes can be used with the support merely upon adjusting the rail to the desired height. The support also has a clamp finger for urging a portion of the frame into engagement with the heater element to assure positive heat transfer between the heater element and the frame when a chip is to be bonded to the corresponding leads thereof.

The invention is simple and rugged in construction, can readily be used for manual movement of the frame past the heater element, and allows for immediate adjustment to accommodate it to various sizes of frames. The support has a minimum number of parts and provides a simple way of releasing the frame from clamped relationship to the heater element when it is desired to manually move the frame past the same.

The primary object of this invention is to provide an improved support for a die support frame wherein the support has adjustable structure thereon for positioning the frame in a generally vertical plane yet allow the frame to be moved manually in a horizontal direction so that the support is suitable for use with frames of different sizes and the frames can be easily and quickly moved from one operative position to another relative to a heater element carried by the support.

Another object of this invention is to provide a support of the type described wherein the support has a generall horizontal, frame-supporting rail which is adjustably mounted on the support itself so that, by adjusting the height of the rail relative to a heater element, the height of the frame relative to the heater element of the support can be changed to thereby permit the support to accommodate frames of different sizes.

Another object of this invention is to provide a frame support of the aforesaid character wherein the support has means assuring that the frame is positively clamped against the heater element yet the support is easy to use, is simple and rugged in construction, and requires a minimum of parts and takes up only a minimum of space.

Other objects of this invention will become apparent as the following specification progresses, reference being had to the accompanying drawings for an illustration of the invention.

Figure 1:
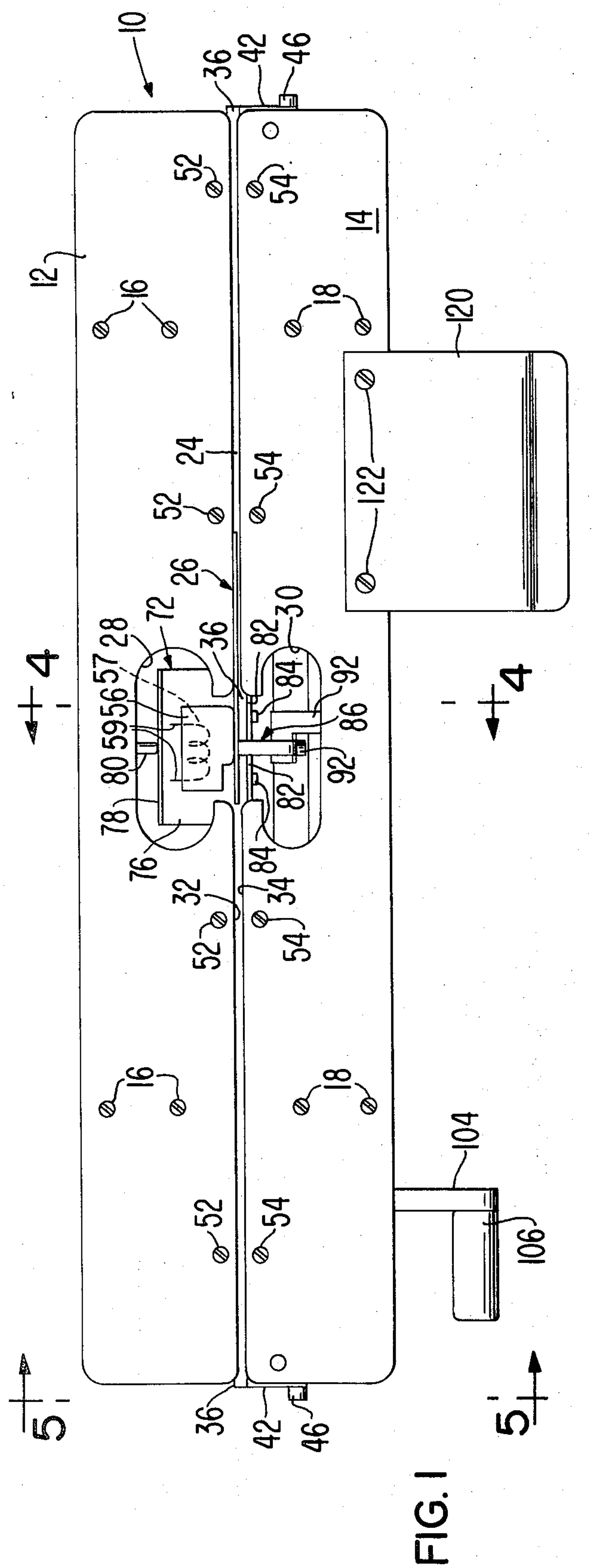
FIG. 1 is a top plan view of the die frame support of this invention.
Figure 2:
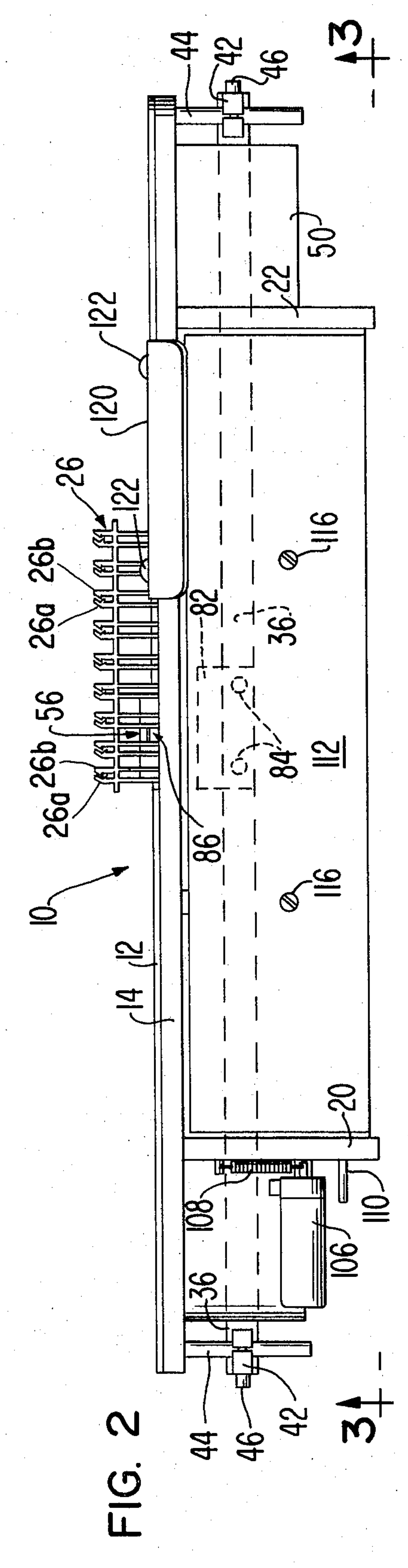
FIG. 2 is a front elevational view of the support.
Figure 3:
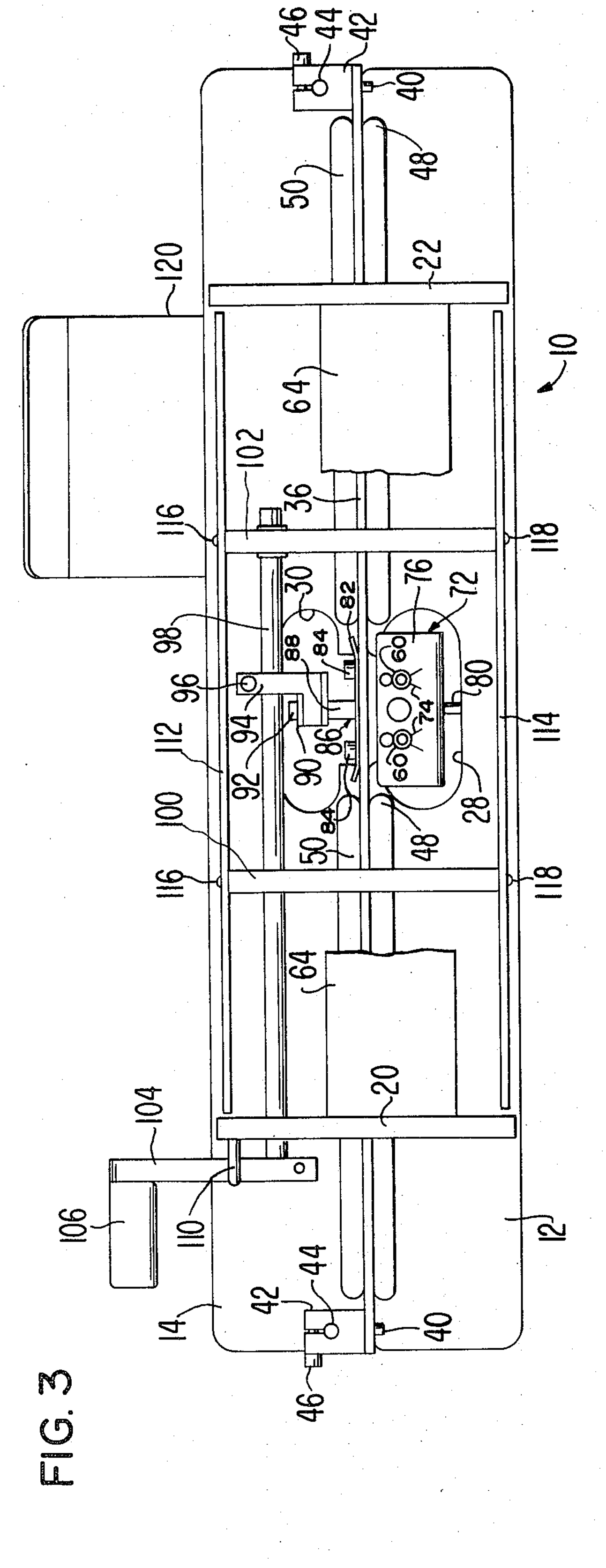
FIG. 3 is a bottom plan view of the support, parts being broken away to illustrate details of construction.
Figure 5:
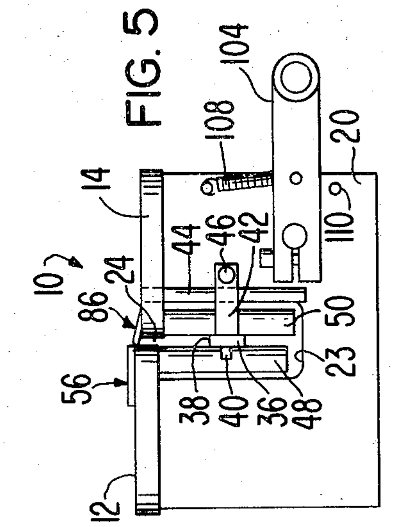
FIG. 5 is an end elevational view looking in the direction of line 5—5 of FIG. 1.
Figure 4:
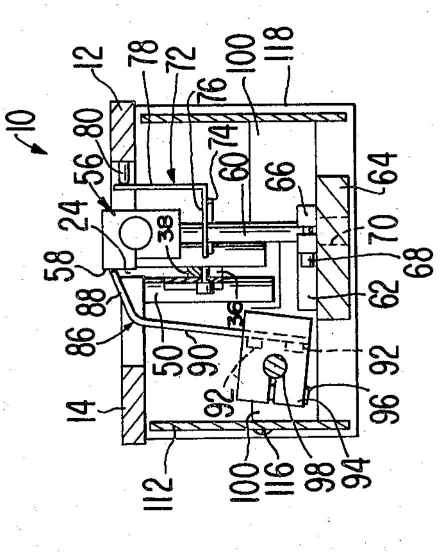
FIG. 4 is a cross-sectional view taken along line 4—4 of FIG. 1.

The die frame support of this invention is broadly denoted by the numeral 10 and includes a pair of generally horizontal top plates 12 and 14 which are secured by screws 16 and 18, respectively, to the upper, flat faces of a pair of opposed, spaced end walls 20 and 22 (FIGS. 2 and 3). Walls 20 and 22 are adapted to rest on a supporting surface, such as a tabletop or the like. Plates 12 and 14 are separated by a gap 24 open at the sides thereof (FIG. 1) so that a planar, vertically disposed die support frame 26 (FIGS. 1 and 2) can be received at one end of the gap and be moved through the gap to the opposite end thereof. Moreover, plates 12 and 14 have respective recesses 28 and 30 formed near the central portions thereof, recess 28 extending into plate 12 from inner side edge 32 thereof; similarly, recess 30 extends into plate 14 from inner side margin 34 which is substantially parallel with and proximal to side margin 32. The upper surface of plate 12 is slightly higher than that of plate 14 as shown in FIGS. 4 and 5.

A generally horizontal rail 36 is disposed below and in vertical alignment with gap 24. Rail 36 spans the length of gap 24 and has a flat, upper face 38 (FIGS. 4 and 5) on which frame 26 is supported and over which the frame is slidable. Rail 36 is provided with a hole at each end thereof for loosely receiving a pin 40 on a respective bracket 42 (FIG. 3) adjustably mounted on a vertical rod 44 rigid to and extending downwardly from plate 14 in the manner shown in FIGS. 2 and 5. A screw 46 carried by each bracket 42 releasably secure the same to the corresponding rod 44 to permit vertical adjustment of the bracket with respect thereto, there being a rod 44 with its bracket 42 at each end of gap 24, respectively.

Rail 36 is disposed between and vertically movable relative to a number of guide plates, specifically, a pair of guide plates 48 (FIG. 3) on one side of the rail and a pair of guide plates 50 on the opposite side thereof. Plates 48 and 50 are secured to plates 12 and 14, respectively, by screws 52 and 54 (FIG. 1). Guide plates 48 and 50 are adjacent to and extend downwardly from respective side margins 32 and 34 of plates 12 and 14, and confine rail 36 to movement only in a generally vertical plane, thereby keeping upper surface 38 of rail 36 vertically aligned with and spaced below gap 24 at all times. The lower margins of plates 48 and 50 terminate above the lower margins of end walls 20 and 22 as shown in FIG. 5.

A heater block 56 having a frame-engaging face 58 is disposed within recess 28 of plate 12 near side margin 32 thereof. Heater block 56 is secured to the upper ends of a pair of tubular posts 60 (FIGS. 3 and 4) whose lower ends are adjustably anchored in a bracket 62 secured to a bottom crosspiece 64 spanning the distance between and secured to end walls 20 and 22 (FIGS. 3 and 4). Heater block 56 has an insulated electrical heating element 57 (FIG. 1) mounted therein, element 57 adapted to be coupled by leads 59 to a source of electrical power so that heat energy generated by the flow of electrical current through element 57 will heat heater block 56. Bracket 62 has a pair of side portions 66 (only one of which is shown in FIG. 4), each portion 66 having a screw 68 for permitting portion 66 to be releasably clamped to the lower end of the corresponding post 60. Crosspiece 64 has an enlarged hole 70 (FIG. 4) therethrough aligned with each post 60, respectively; thus, posts 60 can be adjusted in height relative to crosspiece 64 to thereby permit adjustment in the height of heater block 56 relative to plates 12 and 14.

An L-shaped heat shield 72 is loosely supported on posts 60 by a pair of cotter pins 74 which pass through respective posts 60 and support the horizontal stretch 76 of shield 72. The vertical stretch 78 of the shield extends upwardly from stretch 76 and terminates near the upper surface of plate 12. A pin 80 projecting into recess 28 from plate 12 supports the heat shield and keeps stretch 78 vertically disposed. Shield 72 is made from a suitable reflective material, such as polished steel or the like, to reflect radiation back toward heater block 56. Rail 36 is provided with a planar heat shield 82 secured by screws 84 to the midpoint of the rail as shown in FIG. 2.

A frame clamping device 86 (FIG. 4) having an upper angled finger 88 and a lower segment 90 is provided to clamp a portion of frame 26 against heater face 58. Finger 88 engages frame 26 and forces it against face 58 when device 86 is in a position slightly to the left of the full-line position of FIG. 4.

The lower end of segment 90 of device 86 is secured by screws 92 to a bracket 94 adjustably mounted by a screw 96 on a horizontal shaft 98 rotatably mounted in a pair of bearing plates 100 and 102 rigidly secured to bottom crosspiece 64 by screws (not shown). Shaft 98 extends through end wall 20 and is rotatable relative thereto.

A lever 104 rigid to and extending laterally from the outer end of shaft 98 has a knob 106 thereon, whereby shaft 98 can be manually rotated. A coil spring 108 (FIG. 2) biases lever 104 in a counterclockwise sense when viewing FIG. 5 so that finger 88 normally is biased toward heater block 56. A pin 110 secured to and extending outwardly from end wall 20 provides a stop engaged by lever 104 when the same is pivoted through a small arc in a clockwise sense when viewing FIG. 5.

The region containing posts 60 and device 86 is enclosed by a pair of sidewalls 112 and 114 which are secured to and span the distance between end walls 20 and 22 as shown in FIG. 3. Specifically, sidewalls 112 and 114 are secured by screws 116 and 118 to the end faces of bearing plates 100 and 102. A plate 120 secured by screws 122 to the upper surface of plate 14 (FIG. 1) extends laterally therefrom and provides a handrest for the operator of support 10.

In use, frame support 10 is disposed on a support surface and a frame 26 is manually placed in gap 24, resting on the upper margin of rail 26. The rail is adjusted in height by adjusting brackets 42 on rods 44. Frame 26 is adjusted in height with respect to heater block 56.

When the proper height has been reached, the operator manually moves the frame incrementally past the heater block so that successive portions of the frame are moved into and out of heat exchange relationship to the heater block. Each time the frame is to be moved, the operator engages knob 106, forcing the latter downwardly until lever 104 engages stop pin 110. When this occurs, clamping device 86 moves away from heater block 56 and frame 26 is manually moved to the next operative position, namely, when the next successive portion of the frame to be heated is aligned with the heater block. Then, knob 106 is released, causing clamping device 86 to return to its clamping position under the bias force of spring 108. The aligned frame portion is then moved into engagement with the heater block and heated thereby. The foregoing method is continued until all of the various portions of the frame are heated and have chips bonded to respective pairs of terminals 26*a* and 26*b* (FIG. 2) at the upper margins thereof. At the end of the chip bonding operation, the frame is manually lifted out of gap 24 near the downstream end thereof and a second frame is inserted at the upstream end, namely, at the right-hand end when viewing FIG. 1.

I claim:

1. Apparatus for supporting a planar frame comprising: a rail; means coupled with the rail for adjustably mounting the same in a generally horizontal position; means disposed on opposite sides of the rail for forming a gap above and aligned with the rail through which a planar frame can move when the frame is supported on the rail in a substantially vertical plane and as the frame extends upwardly from the gap; a heater block having a heater element adapted to be coupled to a source of electrical power, said heater block being disposed adjacent to said plane; and means adjacent to said heater block for releasably urging successive portions of the frame into heat transfer relationship to the heater block.

2. Apparatus as set forth in claim 1, wherein is included means for releasably clamping the frame against the heater element.

3. Apparatus as set forth in claim 2, wherein is included an actuator coupled with said clamping means remote from said heater element for moving said clamping means away from said heater element, and means biasing said clamping means toward said heater element.

4. Apparatus as set forth in claim 1, wherein said mounting means includes a generally horizontal plate having a pair of opposed ends, and structure secured to and depending from each end of the plate, respectively, each end of said rail being adjustably mounted on the lower end of the corresponding structure.

5. Apparatus as set forth in claim 1, wherein is included a pair of spaced end walls, a pair of top plates secured to the end walls and being separated from each other to present a frame-receiving gap therebetween, said rail being vertically aligned with and spaced below the gap, said mounting means including structure coupled to one of the plates.

6. Apparatus as set forth in claim 5, wherein said one plate has a pair of rods secured to and depending from respective ends thereof, each rod having a bracket adjustably mounted thereon, each end of the rail being releasably coupled to a corresponding bracket.

7. Apparatus as set forth in claim 6, wherein is provided a guide plate for each top plate, respectively, the guide plates being rigidly secured to respective top plates adjacent to the gap and depending therefrom on respective sides of the rail, the rail being disposed between the guide plates and confined thereby for vertical movement only.

8. Apparatus as set forth in claim 1, wherein is included a pair of spaced walls, a crosspiece spanning the distance between the walls, a pair of spaced bearing plates secured to the crosspiece, a shaft rotatably mounted on and spanning the distance between the bearing plates, means coupled with the shaft for rotating the same in one direction, means biasing the shaft for rotation in the opposite direction; a bracket adjustably mounted on the shaft between the bearing plates, a clamping device secured to the bracket, the device being operable to clamp a portion of the frame against said heater element.

9. Apparatus as set forth in claim 1, wherein is included a heat shield adjacent to the heater element for reflecting heat radiation thereby back toward the same.

10. Apparatus for supporting a planar die support frame comprising: a pair of spaced, generally parallel vertical walls; a pair of top,. generally horizontal walls secured to and spanning the distance between the vertical walls, said top plates being separated to form a frame-receiving gap therebetween; a rigid rail; means on one of the top plates for adjustably mounting the rail therebelow in a generally horizontal position and in generally vertical alignment with the gap, whereby a frame disposed in the gap will be disposed in a vertical plane and be supported on and be slidable over the rail longitudinally of the gap; a heater element disposed adjacent to the gap intermediate the ends thereof and in proximity thereto to permit a die support frame supported on the rail to move into heat transfer relationship with the heater element; and means coupled with at least one of the walls for releasably clamping a portion of the frame to the heater element.

11. Apparatus as set forth in claim 10, wherein said clamping means includes a clamping finger, a bracket coupled to one end of the clamping finger and a generally horizontal, rotatable shaft, said bracket being adjustably mounted on said shaft, and means biasing the shaft in a direction to cause said clamping finger to be urged toward the heater element.

12. Apparatus as set forth in claim 10, wherein said other top plate has a recess therethrough adjacent to said gap, said heater element projecting through said recess, and means on opposite sides of the rail for guiding said frame over the rail.

* * * * *